US009026265B2

(12) United States Patent
Hanai et al.

(10) Patent No.: US 9,026,265 B2
(45) Date of Patent: May 5, 2015

(54) VEHICLE COMMUNICATION SYSTEM BETWEEN A DEVICE CONTROL ECU AND AN INFORMATION APPARATUS

(71) Applicant: Denso Corporation, Kariya, Aichi-pref. (JP)

(72) Inventors: Shouichirou Hanai, Anjo (JP); Tadaki Bunya, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 14/018,677

(22) Filed: Sep. 5, 2013

(65) Prior Publication Data
US 2014/0067157 A1    Mar. 6, 2014

(30) Foreign Application Priority Data
Sep. 6, 2012    (JP) .................. 2012-196255

(51) Int. Cl.
*B60W 50/00*    (2006.01)
*G06F 7/00*    (2006.01)
*G06F 11/00*    (2006.01)
*F02D 41/26*    (2006.01)
*F02D 41/24*    (2006.01)
(Continued)

(52) U.S. Cl.
CPC ............ *B60W 50/00* (2013.01); *F02D 41/249* (2013.01); *F02D 41/266* (2013.01); *G06F 11/00* (2013.01); *G06F 7/00* (2013.01); *G06F 13/126* (2013.01); *G05B 2219/2208* (2013.01); *B60R 16/02* (2013.01)

(58) Field of Classification Search
None
See application file for complete search history.

(56) References Cited

U.S. PATENT DOCUMENTS
8,219,279 B2 *   7/2012  Merrick et al. .............. 701/33.4
2004/0254766 A1 * 12/2004 Ito ................................ 702/188
(Continued)

FOREIGN PATENT DOCUMENTS
JP    07-093006    4/1995
JP    08-128355    5/1996
(Continued)

OTHER PUBLICATIONS
Office Action dated Jul. 1, 2014 in corresponding Japanese Application No. 2012-196255.

*Primary Examiner* — Rami Khatib
*Assistant Examiner* — Jeffrey Boomer
(74) *Attorney, Agent, or Firm* — Harness, Dickey & Pierce, PLC

(57) ABSTRACT

A vehicle communication system includes at least one device control apparatuses. One device control apparatus has an electronic controller. The vehicle communication system includes an information memory apparatus that is another vehicle apparatus different from the first device control apparatuses. The electronic controller of the device control apparatus stores a variation information memory, a process execution portion and a vehicle information obtaining portion. The information memory apparatus stores a vehicle information memory and a vehicle information providing portion. The process execution portion switches and executes a content of the device control process based on the variation information. The vehicle information is related to specifications of a vehicle on which the vehicle communication system is mounted, and it is obtained from the information memory apparatus. The variation information is extracted from the vehicle information so that the variation information is stored into the variation information memory.

10 Claims, 8 Drawing Sheets

(51) Int. Cl.
*B60R 16/02* (2006.01)
*G06F 13/12* (2006.01)

(56) References Cited

U.S. PATENT DOCUMENTS

2007/0283110 A1* 12/2007 Arai et al. ............... 711/162
2010/0004812 A1* 1/2010 Merrick et al. ........... 701/33
2012/0127928 A1* 5/2012 Ichihara .................. 370/328
2012/0231766 A1* 9/2012 Jain et al. ................ 455/411
2012/0265405 A1* 10/2012 Matsumura et al. ...... 701/45

FOREIGN PATENT DOCUMENTS

| JP | 2004-257327 | 9/2004 |
| JP | 2004-340779 | 12/2004 |
| JP | 2006-082649 | 3/2006 |
| JP | 2007-055560 | 3/2007 |
| JP | 2007-237768 | 9/2007 |

* cited by examiner

VEHICLE COMMUNICATION SYSTEM BETWEEN A DEVICE CONTROL ECU AND AN INFORMATION APPARATUS

CROSS REFERENCE TO RELATED APPLICATION

This application is based on Japanese Patent Application No. 2012-196255 filed on Sep. 6, 2012, the disclosure of which is incorporated herein by reference.

TECHNICAL FIELD

The present disclosure relates to a vehicle communication system, including at least one vehicle apparatus, each of which has an electronic controller that executes a process.

BACKGROUND

Conventionally, a single electric control unit (ECU) or an integrated ECU is known as a vehicle apparatus that is mounted and used on a vehicle. The single ECU has a controller to control a device (hereinafter, referred to as a device portion) such as an actuator or a sensor to be a controlled object. The integrated ECU includes the device portion and the controller integrally. A device control ECU collectively denotes the single ECU and the integrated ECU.

In such the device control ECU, in order to execute a process with satisfying required specifications regardless of a variation of a characteristic of the device portion, it is required to actually measure the characteristic of the device portion, to obtain characteristic information based on a measurement result, and to store the characteristic information in the controller (e.g., referring to JP-A-2004-257327).

Incidentally, in a case of the single ECU, a process for storing such the characteristic information into the controller is conventionally performed at a vehicle factory, where the single ECU is mounted on a vehicle. In a case of the integrated ECU, the process for storing such the characteristic information into the controller is conventionally performed at a manufacturer, producing the integrated ECU, before shipping.

SUMMARY

It is an object of the present disclosure to provide a vehicle communication system, which is provided by a vehicle apparatus. The vehicle apparatus has an electronic controller to execute a process with a device portion.

The vehicle communication system includes at least one device control apparatus (ECU) mounted on a vehicle and having an electronic controller executing an device control process for controlling an external device for driving a predetermined object or a device portion, which obtains information about the predetermined object, and an information memory apparatus mounted on the vehicle and different from the at least one device control apparatus. The electronic controller includes a variation information memory, a process execution portion, and a vehicle information obtaining portion. The variation information memory stores variation information necessary for identifying a variation of the predetermined object. The process execution portion switches and executes a content in the device control process according to the variation information stored in the variation information memory. The vehicle information obtaining portion obtains vehicle information from the information memory apparatus at a predetermined timing, retrieves the variation information from the vehicle information, and controls the variation information memory to store the variation information. The vehicle information relates to a specification of the vehicle, on which the vehicle communication system is mounted. The information memory apparatus includes a vehicle information memory for storing the vehicle information, and a vehicle information providing portion for transmitting the vehicle information stored in the vehicle information memory to the at least one device control apparatus when the at least one device control apparatus requires the vehicle information.

According to the present disclosure, it is possible to reduce a labor hour required for replacement of the device control apparatus since it is unnecessary to store the vehicle information from the external portion again when the device control apparatus is replaced. In addition, it is possible to reduce a labor hour required for management of the replacement part since it is unnecessary that the replacement part of the device control apparatus stores the vehicle information in advance.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
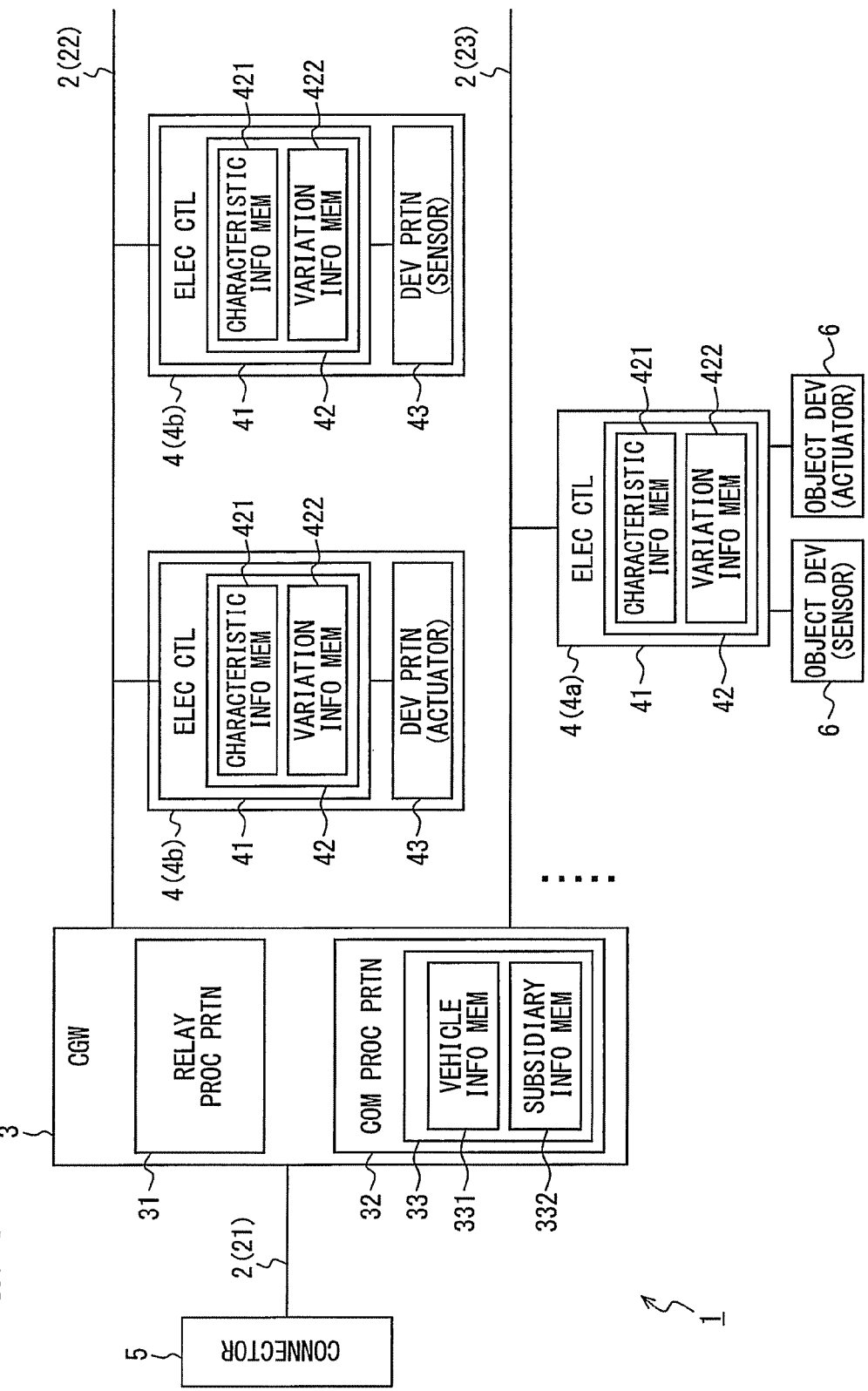
FIG. 1 is a block diagram illustrating an overall configuration of a vehicle communication system.

Inventors of the present disclosure have found the following with regard to a vehicle communication system.

A process executed in a controller is affected by information (hereinafter, a variation information), for example, for identifying a variation of a vehicle on which a device control ECU is mounted, besides characteristic information related to characteristic of a device portion. Thus, in a case where a variation of the vehicle identified by the variation information is associated with an object of the device portion, corresponding to a driven object or a detection object, it may be necessary to appropriately switch a process executed in the controller according to the variation.

In such a case, it is necessary to store the variation information into the electronic controller of the device control ECU. The variation of the vehicle on which the device control ECU is mounted becomes clear only at the vehicle factory. Thus, a process for storing the variation information into the controller is performed at a vehicle factory after the device control ECU is assembled into a vehicle.

The controller of the device control ECU stores device characteristic information or the variation information. The device characteristic information corresponds to information for identifying characteristic of the device portion. The variation information corresponds to information for identifying the variation or the like of the vehicle.

It is supposed that the device control ECU requires to be replaced with a replacement part due to such as a malfunction of the device control ECU. In this case, the replacement part is delivered to a repair shop or a garage without going through the vehicle factory. A manufacturer supplying the replacement part needs to provide the replacement part (i.e., the single ECU or the integrated ECU) having the variation information. Thus, there are variations of the replacement part as many as the number of the vehicle variation to be mounted. Therefore, the manufacturer supplying the replacement part needs to allocate different part numbers to each the replacement part and needs to manage the replacement part. The replacement part has difference only in the stored variation information. Management of the replacement part needs much time and effort.

In addition, especially, the electronic controller of the integrated ECU, comparing with the device portion, is likely to be replaced due to version upgrade. Thus, only the electronic controller may be partially replaced.

When the single ECU or the electronic controller of the integrated ECU is replaced, it is required to store the characteristic information into the replaced electronic controller again. However, the characteristic information can not be stored in advance, since the characteristic information is different in each device portion. It is difficult to easily replace only the electronic controller in any repair shop since a dedicated tool is required to measure the characteristic of the device portion.

Embodiments according to the present disclosure will be described below with reference to drawings.

(Overall Configuration)

As shown in FIG. 1, a vehicle communication system 1 according to the present disclosure includes a communication network 2, a central gateway (CGW) 3, multiple vehicle apparatuses 4, and a connector 5 for connecting to an external tool. The communication network 2 includes multiple sub-networks 21, 22, 23, . . . , each of which is configured by a bus transmission path. The CGW 3 is a vehicle apparatus having a gateway function to relay communication among the sub-networks 21, 22, 23, or the like. Each of the multiple vehicle apparatuses 4 is placed at a predetermined position in the vehicle and executes such as a process to fulfill a pre-assigned function.

Incidentally, a subnetwork 21 of the communication network is connected to only the connector 5, and each of the other subnetworks 22, 23 or the like is connected to at least one vehicle apparatuses 4.

(Vehicle Apparatus)

The vehicle apparatus 4 includes a single ECU 4a having only an electronic controller 41 or an integrated ECU 4b integrally configured from the electronic controller 41 and a device portion 43. The device portion 43 is a device to be a control object of the electronic controller 41. The electronic controller 41 in the vehicle apparatus 4 is mainly configured by a microcomputer and executes a communication process or a device control process. The device control process corresponds to a process execution method or a process execution portion according to the present disclosure. In the communication process, the vehicle apparatus 4 communicates with another vehicle apparatus 4 through the communication network 2. The device control process is a process toward an object device 6, having an actuator or a sensor which is separately provided. Incidentally, the electronic controller 41 in the integrated ECU 4b can be replaced for only the replacement part. Hereinafter, a device control ECU 4 denotes the single ECU 4a and the integrated ECU 4b.

The electronic controller 41 in the device control ECU 4 includes a memory unit 42 configured by a non-volatile memory which can store memory contents in a power-off state and which is rewritable. The memory unit 42 includes a characteristic information memory 421 and a variation information memory 422. The characteristic information memory 421 stores characteristic information for identifying a characteristic of the object device 6 or the device portion 43 (hereinafter, for the sake of simplicity, the device portion denotes the object device and/or the device portion), which are control objects of the electronic controller 41. The variation information memory 422 stores variation information for identifying an object which is a drive object or a detection object of the device portion.

Incidentally, the characteristic information may be information indicating characteristic itself of the device portion, information indicating correction variable to a predetermined standard characteristic or information indicating a kind in which the characteristic of the device portion is separated into various kinds.

In addition, the variation information includes a part of information (i.e., vehicle information) representing specifications of a vehicle. The drive object or the detection object of the device portion may be customized to each vehicle in some cases. In a case where a specific correction or control is needed to a customized object, the variation information denotes information for identifying the customized object (i.e., a variation of the object, furthermore a variation of the vehicle).

The characteristic information and the variation information are used to determine a content of the device control process. Specifically, the characteristic information and the variation information are used to switch a content of a process to another content of a process which is appropriate to the object identified from the variation information. The characteristic information and the variation information are used to correct a controlled variable or a detection variable according to a characteristic identified from the characteristic information. Thus, the characteristic information and the variation information are the same kind of information in, terms of that the characteristic information and the variation information affect the content of the device control process.

Incidentally, in a case where a corresponding relation between the device portion and the object is described as "the device portion"/"the object", for example, the corresponding relation may be such as "a seating sensor"/"a seat", "a electric power steering"/"a steering wheel", "an injector"/"an engine", or "a brake actuator"/"a brake system and a body". The controlled variable or the detection variable of the device portion is varied according to a variation of the object.

The device control ECU 4 stores authentication information for determining compatibility with the vehicle on which the vehicle apparatus 4 is mounted. The compatibility indicates whether the vehicle apparatus 4 can be mounted on the vehicle. The authentication information is stored in the electronic controller 41 in advance by being written into a program or stored into a ROM as data.

(Central Gateway (CGW))

The CGW 3 includes a relay process portion 31 and a communication process portion 32. The relay process portion 31 executes a relay of a communication frame and the communication process portion 32 executes various processes using communication with the external tool connected to various device control ECUs 4 and the connector 5 in a case where communication frames of a source and a destination belong to the different subnetworks 21, 22, 23, or the like.

A process executed by the relay process portion 31 is a well-known process executed in a gateway provided in the communication network so that an explanation will be skipped. The communication process portion 32 is mainly configured by a microcomputer, and at least executes a communication process, an information initialization process, and a backup process. The communication process executes communication with the external tool connected to various device control ECU 4 and the connector 5 through the communication network 2. In the information initialization process, the vehicle information about the vehicle (hereinafter, a subject vehicle), on which the CGW 3 (corresponding to the subject apparatus) is mounted, is obtained. In the backup process, information necessary for controlling the device portion is backed up through communication with the device control ECU 4.

The communication process portion 32 includes a memory device 33, provided by a non-volatile memory which can store memory contents in a power-off state and which is rewritable. The memory device 33 includes a vehicle information memory 331, storing the vehicle information, and a subsidiary information memory 332. The subsidiary information memory 332 stores information which associates the device control ECU 4 with the characteristic information about the device portion to be a control object of the device control ECU 4 (hereinafter, a subsidiary information).

Incidentally, the vehicle information indicates the specifications of the vehicle and at least includes information corresponding to the above described authentication information and the variation information. In the present embodiment, the authentication information includes a vehicle model and a vehicle displacement. The variation information includes other information (e.g., a transmission system: AT or MT, a drive system: 2WD or 4WD, a steering wheel position: left or right, a seat type, an engine type, a brake type, or a vehicle weight).

In addition, in the present embodiment, it is supposed that the CGW 3 is common regardless of vehicle variations. Thus, it is supposed that the CGW 3, different from a case of the device control ECU 4, does not need to determine the compatibility with the vehicle, on which the CGW 3 is mounted, and to possess the authentication information in advance. However, it is supposed that the CGW 3 stores a part information, indicating whether the CGW 3 is an initial part that is mounted on the vehicle initially, or the CGW 3 is a replacement part that is mounted on the vehicle by a part replacement by such as repair.

(Process in CGW)

The information initialization process and the backup process in which the electronic controller of the CGW 3 executes will be described with reference to a flowchart in FIG. 2 and FIG. 3.

Incidentally, the information initialization process is executed each time the CGW 3 starts up. The backup process is started each time the communication frame is received after the information initialization process. The communication frame includes the authentication information from the device control ECU 4 and a demand of the vehicle information.

(Information Initialization Process)

Figure 2:
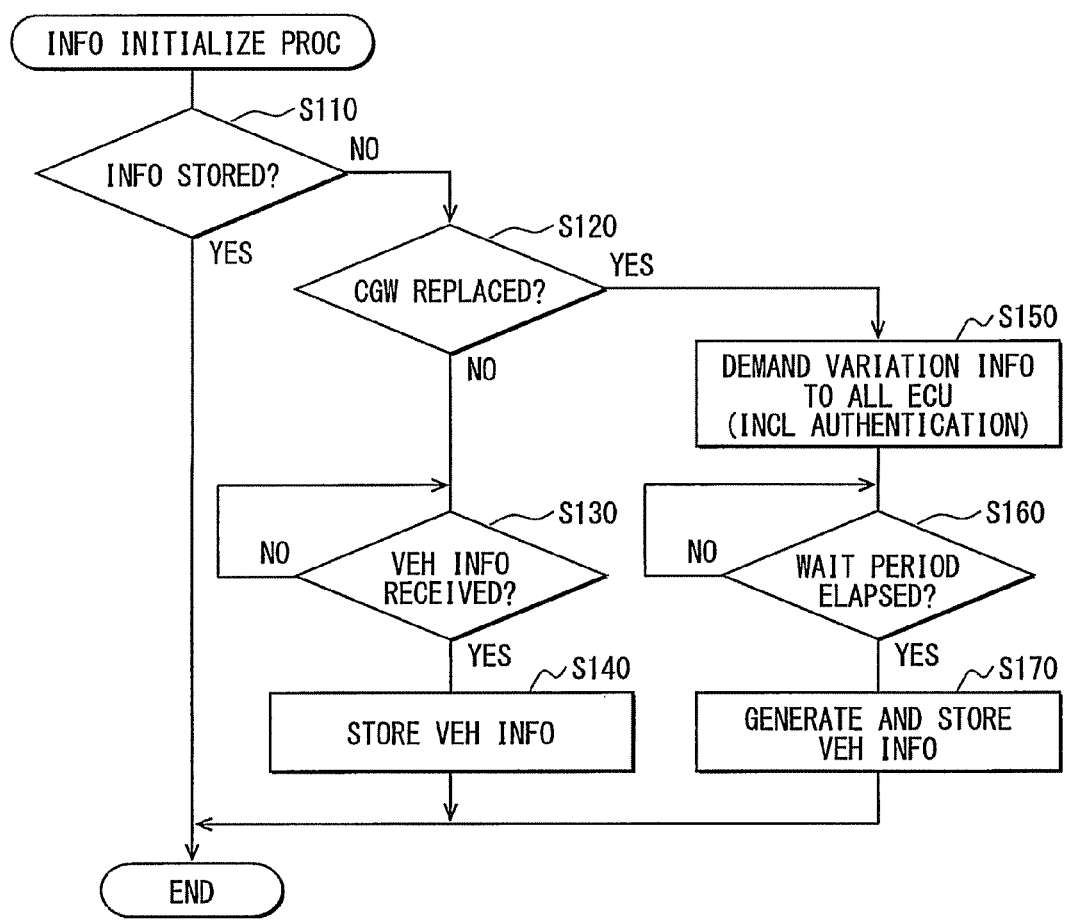
FIG. 2 is a flowchart illustrating a content of a data initialization process executed in a central gateway.

In a case where the information initialization process starts up, as shown in FIG. 2, it is determined at step S110 whether the vehicle information is stored in the vehicle information memory 331 at first. When the vehicle information is stored, the process ends.

In a case where the vehicle information is not stored in the vehicle information memory 331, it is determined at step S120 whether the reason why the vehicle information is not stored is due to a replacement of the CGW 3. It is determined whether the CGW 3 is replaced, according to the part information stored in the CGW 3. In a case where the part information stored in the CGW 3 indicates that the CGW 3 is a replacement part, it is determined that the CGW 3 is replaced. Incidentally, a manner to determine whether the CGW 3 is replaced is not limited to the present embodiment. It may be determined that, for example, the CGW 3 is not replaced or the CGW 3 is an initial part in a case where a writing tool for writing the vehicle information is connected to the connector 5. It may be determined that the CGW 3 is replaced or the CGW 3 is a replacement part in a case where the writing tool is not connected to the connector 5.

In a case where it is determined at step S120 that the CGW 3 is not replaced, that is, it is determined that the subject apparatus (the CGW 3) is the initial part assembled into the vehicle at the vehicle factory, the process waits until the vehicle information is received from the writing tool through the connector 5 at step S130. When the vehicle information is received, the vehicle information is stored into the vehicle information memory 331 at step S140 and the process ends.

In a case where it is determined at step S120 that the CGW 3 is replaced (i.e., an initialization condition according to the present embodiment is satisfied), that is, it is determined that the subject apparatus (corresponding to the CGW 3) is the replacement part, replaced at such as a repair shop, a demand of the variation information is sent to all device control ECUs 4 (corresponding to the single ECUs or the integrated ECUs) configuring the vehicle communication system 1 at step S150 since it is not possible to receive the vehicle information from an external portion.

Subsequently, the process waits for a predetermined waiting period at step S160. When the waiting period is elapsed, all the variation information, received from the device control ECU 4 during the waiting period, is merged into the vehicle information. The generated vehicle information is stored in the vehicle information memory 331 at step S170, and the process ends.

According to the process, the memory device 33 (especially, the vehicle information memory 331) of the CGW 3 stores the vehicle information. This state corresponds to an initial setting.

(Backup Process)

Figure 3:
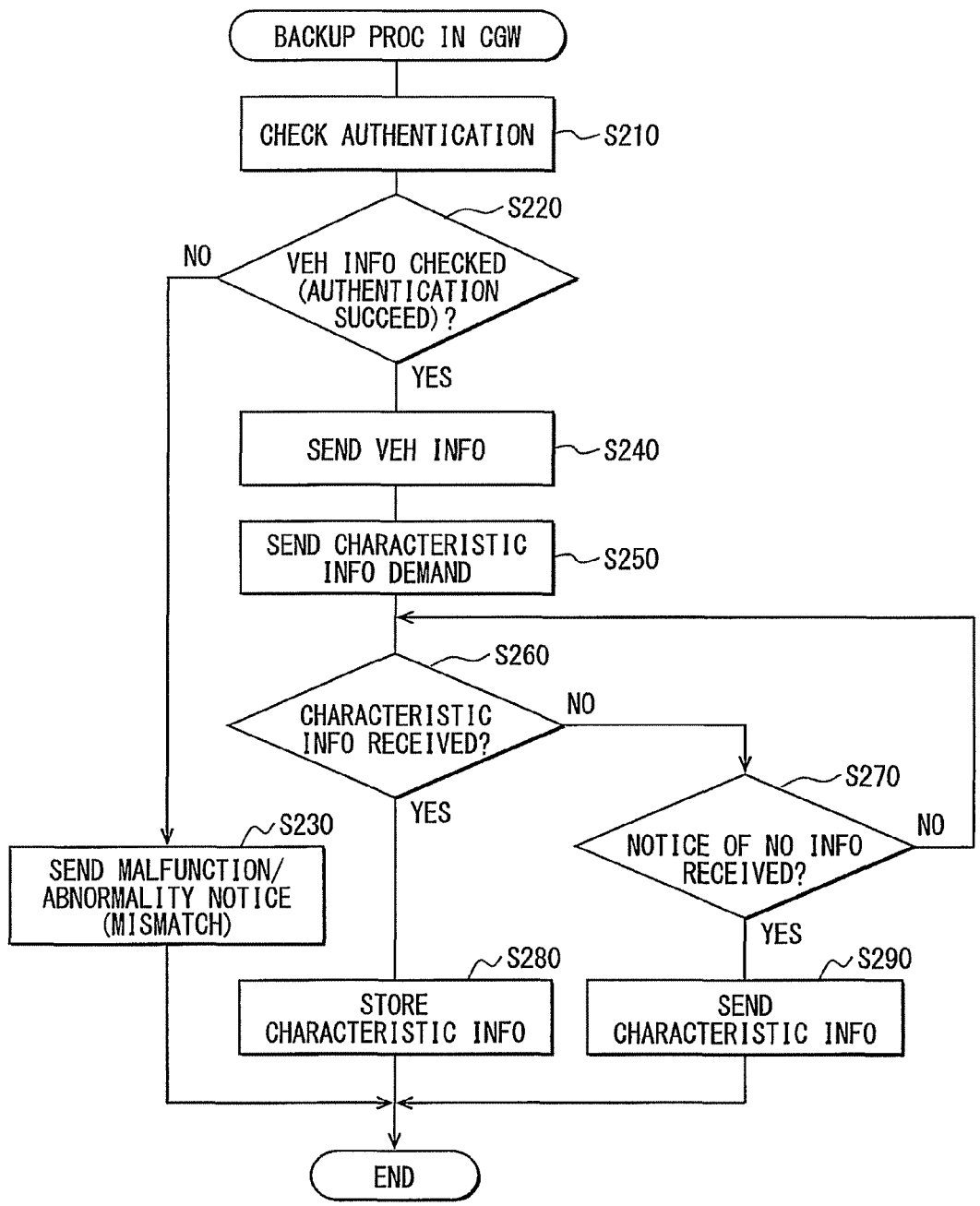
FIG. 3 is a flowchart illustrating a content of a backup process executed in the central gateway.

In a case where the process starts up, as shown in FIG. 3, the authentication information, which is indicated by the received communication frame, is compared with the vehicle information, which is stored in the vehicle information memory 331 at step S210. The authentication information includes information about a compatible vehicle model or a displacement of a compatible vehicle.

As a result of comparison, it is determined whether the authentication information is matched to the vehicle information at step S220. In a case where it is determined that the authentication information is mismatched to the vehicle information, it is determined that authentication of the device control ECU 4 is failed. In this case, the device control ECU 4 (hereinafter, a source ECU) is a source of the communication frame, which is a cause of a start up of the process. The communication frame corresponds to a vehicle information demand. A malfunction notice is sent to the source ECU to indicate that the vehicle model in the source ECU is mismatched. A worker, who assembled or replaced the CGW 3 or the device control ECU 4, is informed through an unshown informing apparatus at step S230 and the process ends.

In a case where, at step S220, the authentication information is matched to the vehicle information, it is determined that the source ECU is successfully authorized. The vehicle information, stored in the vehicle information memory 331, is sent to the source ECU at step S240, and then a characteristic information demand is sent to the source ECU at step S250.

Subsequently, the process waits until the characteristic information is received from the source ECU at step S260 or a notice indicating that characteristic information is not stored is received at step S270. In a case where the characteristic information is received, information (corresponding to a subsidiary information) associating the received characteristic information with the source ECU is stored in the subsidiary information memory 332 at step S280, and the process ends. In a case where the notice, indicating that characteristic information is not stored, is received, the characteristic information about the source ECU is read out from the subsidiary information memory 332, the characteristic information is sent to the source ECU at step S290 and the process ends.

(Process in ECU)

Figure 4:
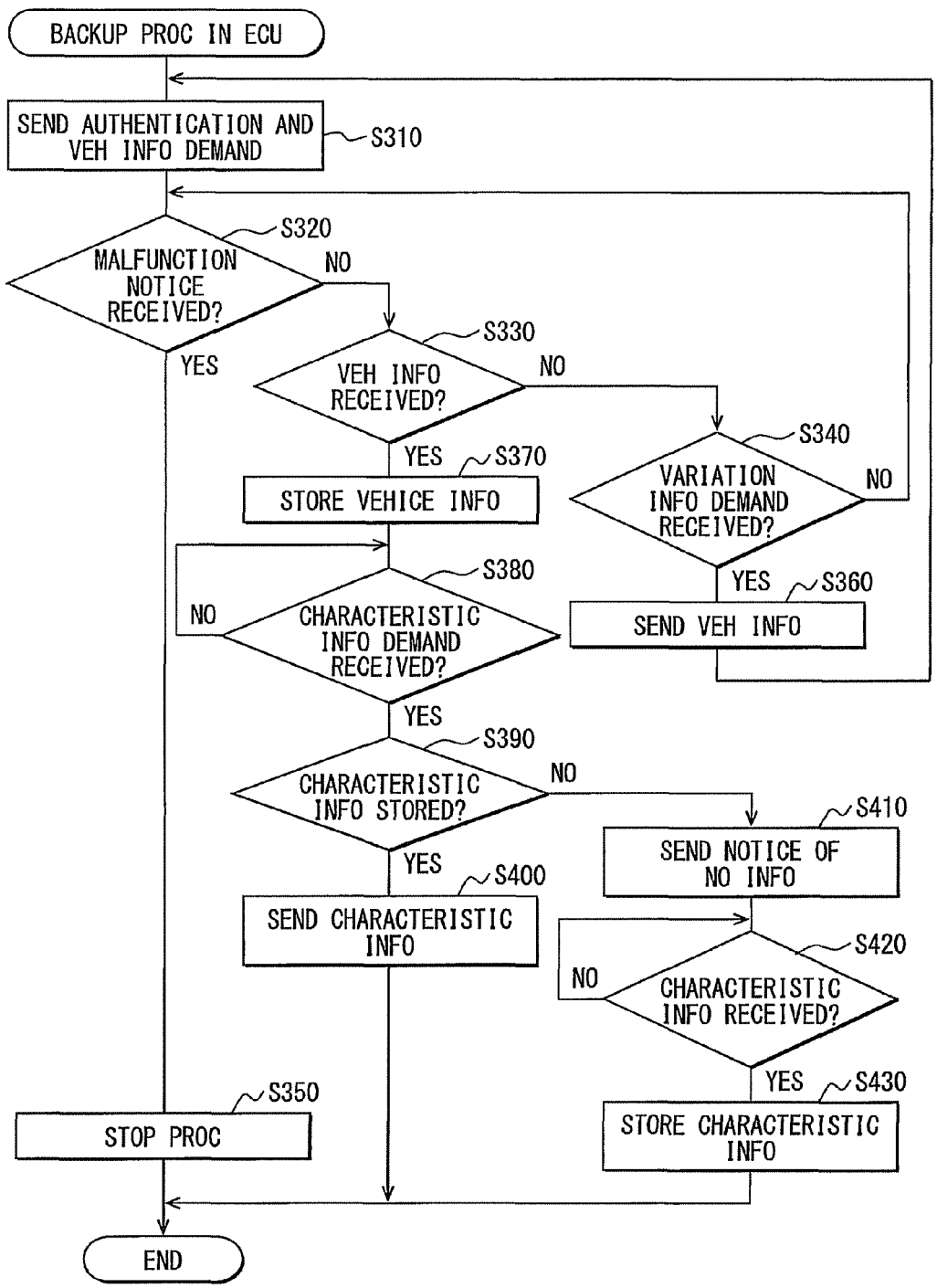
FIG. 4 is a flowchart illustrating a content of a backup process executed in an integrated ECU.

Next, a process executed by the electronic controller 41 in the device control ECU 4 will be described with reference to a flowchart in FIG. 4.

The process is executed each time the device control ECU 4 starts up. In a case where the process starts up, the vehicle information demand is sent at step S310. The vehicle information demand is combined with a provision of the authentication information. The process waits until the malfunction notice is received from the CGW 3 at step S320, a vehicle information notice is received at step S330, or a variation information demand is received at step S340.

In a case where the malfunction notice is received, it is determined that the subject apparatus (corresponding to the electronic control ECU 4) is assembled into an incompatible vehicle. An operation of the subject apparatus is stopped at step S350 and the process ends. In a case where the variation information demand is received, the authentication information, stored in the ECU, and the variation information, stored in the variation information memory 422, are sent to the CGW 3 at step S360 and the process returns to step S310.

In a case where the vehicle information is received from the CGW 3, information related to the device portion, which is the control object of the subject apparatus, is extracted from the received vehicle information. The extracted information is stored as the variation information in the variation information memory 422 at step S370.

Subsequently, the process waits until the characteristic information demand is received from the CGW 3 at step S380. When the characteristic information demand is received, it is determined whether the characteristic information is stored in the characteristic information memory 421 at step S390.

In a case where the characteristic information is stored, the characteristic information in the characteristic information memory 421 is sent to the CGW 3 at step S400 and the process ends. In a case where the characteristic information is not stored, the notice, indicating that characteristic information is not stored, is sent to the CGW 3 at step S410 and the process wait until the characteristic information is received from the CGW 3 at step S420.

In a case where the characteristic information is received, the characteristic information is stored in the characteristic information memory at step S430, and the process ends.

(Operation)

A process flow performed before or after an assembly of the integrated ECU 4b into a vehicle will be described separated by cases. Incidentally, a process flow in the single ECU 4a is similar to the process flow in the integrated ECU 4b other than that the characteristic information about the object device 6 is written at the vehicle factory, not at the manufacturer.

Figure 5:
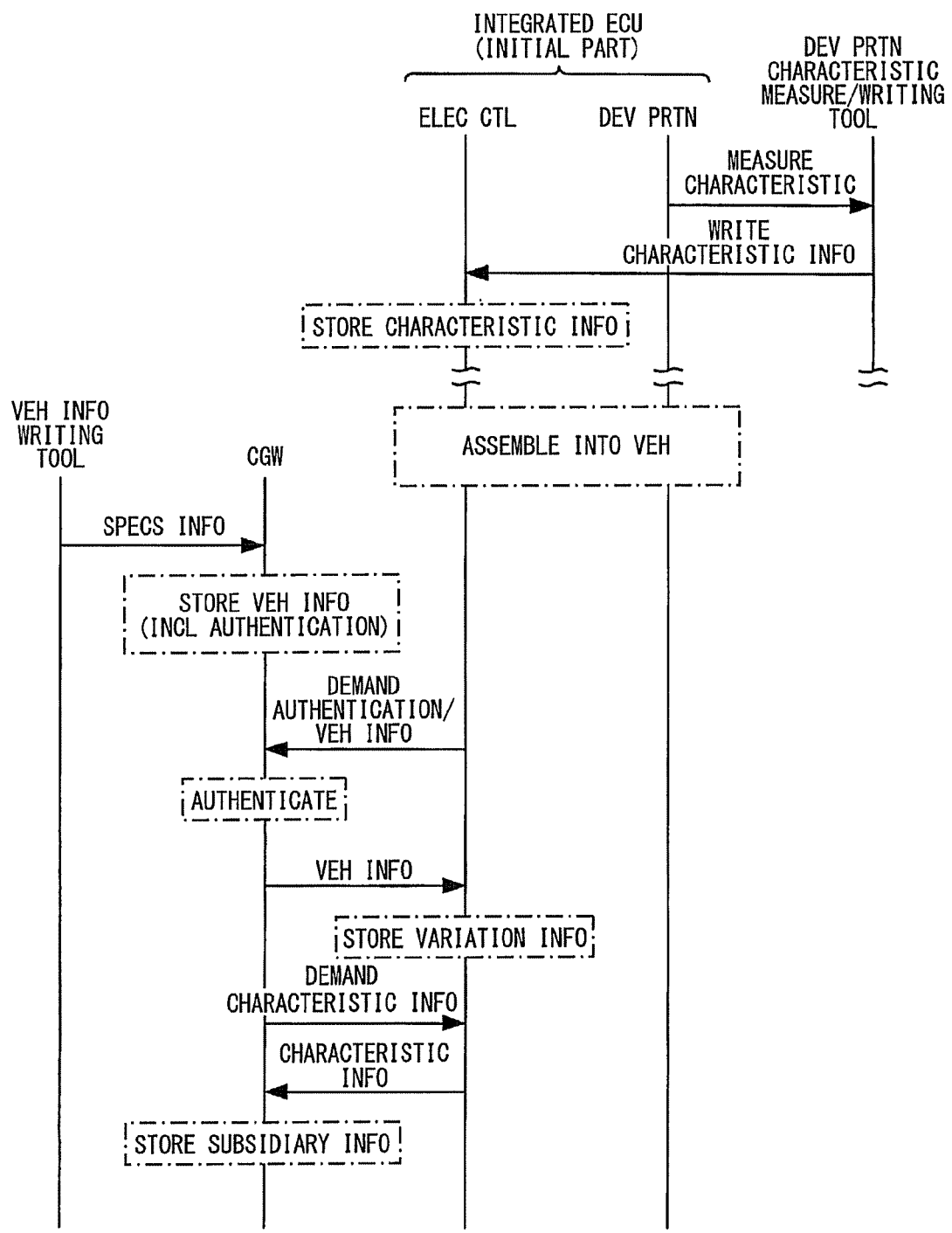
FIG. 5 is a sequence diagram illustrating a process flow performed when an initial part is assembled in a vehicle factory.

(1) Case where the initial part is assembled into the vehicle at the vehicle factory (referring to FIG. 5)

The manufacturer producing the integrated ECU 4b measures the characteristic of the device portion 43 by a dedicated measuring tool. The characteristic information is produced based on a result of the measurement. The manufacturer stores the characteristic information into the characteristic information memory 421 before shipping by a dedicated writing tool.

Thus, the integrated ECU 4b is shipped with storing the characteristic information into the characteristic information memory 421, regardless of the initial part or the replacement part. In this case, nothing is stored in the variation information memory 422.

The integrated ECU 4b is assembled into the vehicle with another ECU at the vehicle factory. In this case, nothing is stored in the vehicle information memory 331 and the subsidiary information memory 332 of the CGW 3, assembled into the vehicle with the integrated ECU 4b.

Subsequently, at the vehicle factory, the vehicle communication system 1 starts up. The vehicle information is provided to the CGW 3 with the dedicated writing tool through the connector 5. In this case, nothing is stored in the vehicle information memory 331 of the CGW 3 (i.e., "NO" at step S110), and the CGW 3 is not replaced (i.e., "NO" at step S120). Thus, the provided vehicle information is stored in the vehicle information memory 331 at step S130 and step S140.

Subsequently, the following processes are separately executed to each integrated ECU. When the integrated ECU 4b (hereinafter the source ECU) starts up, the vehicle information demand, which is combined with a provision of the authentication information, is sent to the CGW 3 at step S310. The CGW 3, receives the vehicle information demand, checks the provided authentication information with the vehicle information, stored in the vehicle information memory 331 at step S210. In a case where the provided authentication information and the vehicle information are matched (i.e., authentication succeeds or "YES" at step S220), the vehicle information stored in the vehicle information memory 331 is sent to the source ECU at step S240. The source ECU which receives the vehicle information extracts the variation information from the received vehicle information. The source ECU stores the variation information into the variation information memory 422 (i.e., "YES" at step S330) so that the process proceeds to step S370.

In addition, the CGW 3 sends the characteristic information demand to the same source ECU after sending the vehicle information at step S250. The source ECU that receives the characteristic information demand is in a storing state that the characteristic information is stored in the characteristic information memory 421 (i.e., "YES" at step S390). Thus, the source ECU sends the stored characteristic information to the CGW 3 at step S400. When the CGW 3 receives the characteristic information (i.e., "YES" at step S260), the CGW 3 associates the characteristic information with the source ECU so that the CGW 3 stores the characteristic information into the subsidiary information memory 332.

According to this process, the source ECU (corresponding to the integrated ECU 4b) stores both of the characteristic information of the device portion 43, integrated with the source ECU, and the variation information, which corresponds to the vehicle information related to the device portion 43. In addition, the CGW 3 stores the vehicle information (including authentication information and all the variation information) and the characteristic information (i.e., the subsidiary information) about the device portion 43 of all the integrated ECU 4b assembled in the vehicle. Thus, all the variation information and the characteristic information, stored in the integrated ECU 4b assembled into the vehicle, are stored and backed up in the CGW 3.

Figure 6:
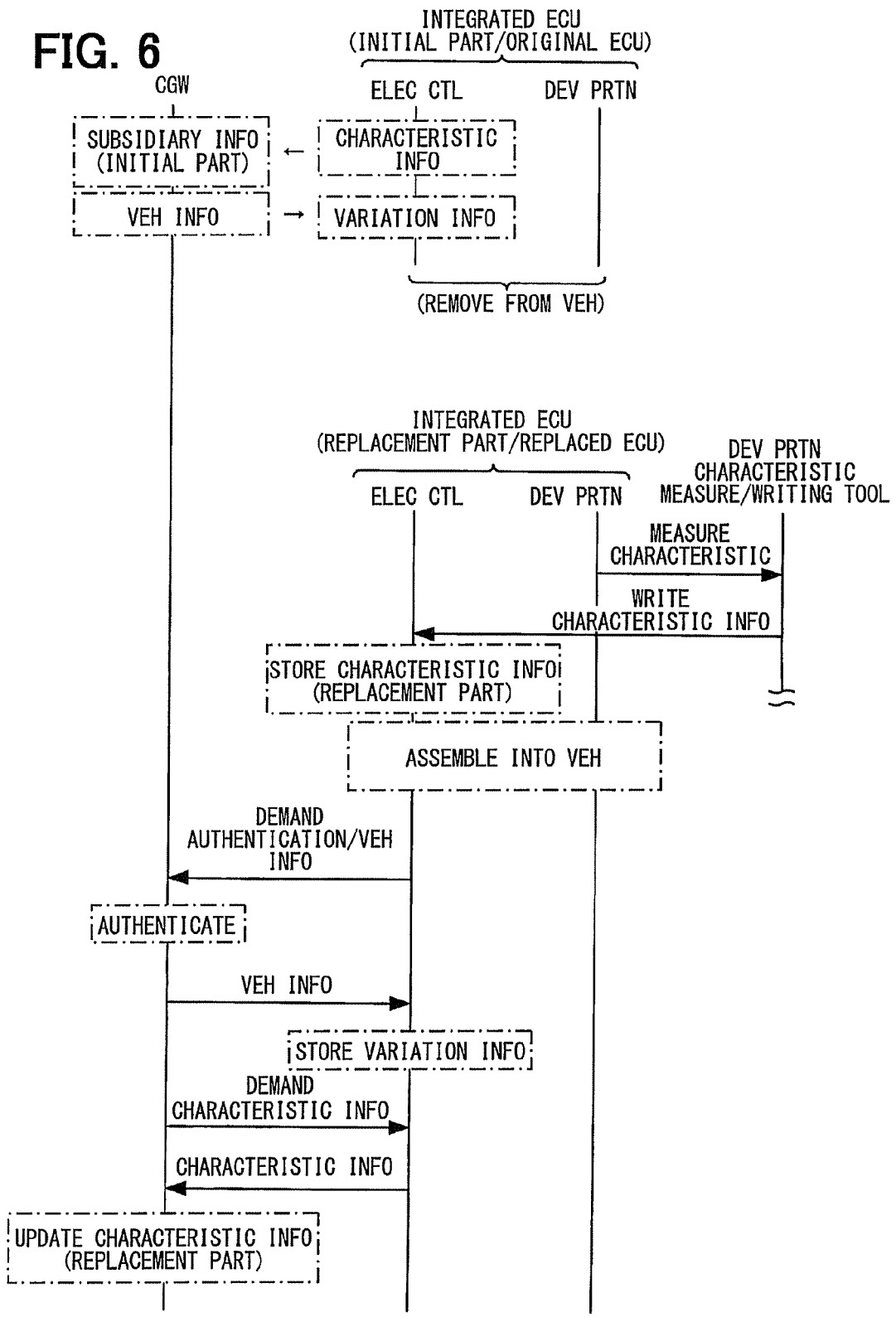
FIG. 6 is a sequence diagram illustrating a process flow performed when the integrated ECU is replaced.

(2) Case where the electronic controller 41 and the device portion 43 of the integrated ECU 4b is replaced together (referring to FIG. 6).

Before the integrated ECU 4b is replaced, the above process described in case (1) is executed. Thus, the characteristic information is stored in the characteristic information memory 421 and the variation information is stored in the variation information memory 422 in the integrated ECU 4b before replacement. Hereinafter, the integrated ECU 4b before replacement denotes an original ECU. In addition, the vehicle information is stored in the vehicle information memory 331 of the CGW 3, and the characteristic information of the original ECU is stored in the subsidiary information memory 332 of the CGW 3.

In this case, when the original ECU is removed and substituted for a replacement part, provided by a manufacturer producing the integrated ECU, the integrated ECU of the replacement part (hereinafter, a replaced ECU) only stores the characteristic information, does not store the variation information and is assembled into the vehicle at the repair shop.

After the replaced ECU is assembled into the vehicle as described above, when the vehicle communication system 1 starts up, the replaced ECU sends the vehicle information demand, which is combined with the provision of the authentication information, to the CGW 3. Subsequently, by the process similar to the case (1), the vehicle information is provided from the CGW 3 to the replaced ECU. The characteristic information is provided from the replaced ECU to the CGW 3. As a result, the variation information is stored in the replaced ECU. The variation information is based on the vehicle information stored in the vehicle information memory 331 of the CGW 3. The memory contents of the subsidiary information memory 332 in the CGW 3 are updated by the characteristic information, provided from the replaced ECU.

Figure 7:
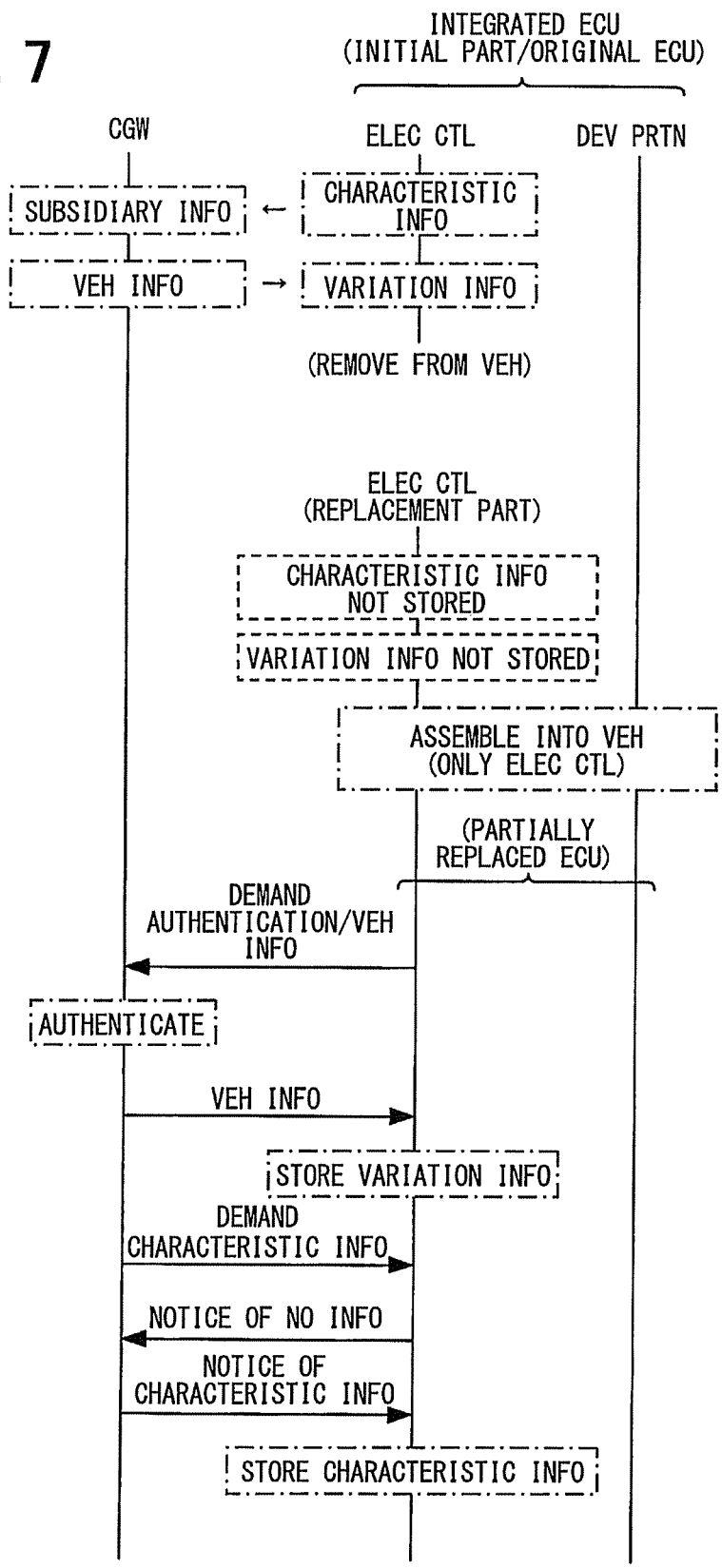
FIG. 7 is a sequence diagram illustrating a process flow performed when only an electronic controller of the integrated ECU is replaced.

(3) Case where only the electronic controller 41 of the integrated ECU 41b is replaced (referring to FIG. 7)

A situation of the integrated ECU 4b and the CGW 3 before replacement is similar to the situation in the case (2).

In this case, only the electronic controller 41 of the integrated ECU 4b is removed and substituted for a replacement part, provided by a manufacturer producing the electronic controller 41. The integrated ECU of which the electronic controller 41 is replaced corresponds to a partially replaced ECU. The partially replaced ECU stores nothing in the characteristic information memory 421 and the variation information memory 422.

After the electronic controller 41 is replaced, when the vehicle communication system 1 starts up, the partially replaced ECU sends the vehicle information demand, which is combined with the provision of the authentication information, to the CGW 3. Subsequently, by the process similar to the case (1), the vehicle information is provided from the CGW 3 to the partially replaced ECU.

Subsequently, the CGW 3 sends the characteristic information demand to the partially replaced ECU at step S250. Since the characteristic information is not stored in the characteristic information memory 421 (i.e., "NO" at step S390), the partially replaced ECU which receives the characteristic information demand sends the notice to indicate that characteristic information is not stored to the CGW 3 at step S410. In a case where the CGW 3 receives the notice, indicating that characteristic information is not stored (i.e., "YES" at step S270), the CGW 3 sends the characteristic information (i.e., the characteristic information about the original ECU) to the partially replaced ECU. The characteristic information is associated with the partially replaced ECU and stored in the subsidiary information memory 332. The partially replaced ECU that receives the characteristic information stores the received characteristic information into the characteristic information memory 421 at step S420 and step S430.

The device portion 43 of the partially replaced ECU is identical with the device portion 43 of the original ECU. Thus, the backed-up characteristic information about the original ECU can be used for the partially replace ECU even when the electronic controller 41 is replaced.

According to this process, the partially replaced ECU stores the correct characteristic information and the correct variation information without providing both of the information again from an external portion after replacement. Thus, it is possible to set the partially replaced ECU to operate normally.

Incidentally, the process about the partially replaced ECU is similar to a case in which the single ECU 4a is replaced.

(4) Case where the CGW 3 is replaced

When the CGW 3 is replaced, the vehicle information and the subsidiary information are not stored in the replaced CGW 3.

In this case, when the vehicle communication system 1 starts up, information is not stored in the vehicle information memory 331 (i.e., "NO" at step S110), and the CGW 3 is replaced or the determination in step S120 is "YES". Thus, the CGW 3 sends the variation information demand to all the ECUs (corresponding to the device control ECU 4) at step S150. Each of the ECUs, which receives the variation information demand, sends the authentication information stored in each of the ECUs and the variation information stored in the variation information memory 422 to the CGW 3 (i.e., "YES" at step S340 and step S360). The CGW 3 merges the variation information, sent from each of the ECUs, into the vehicle information, and stores the vehicle information into the vehicle information memory 331 at step S160 and step S170).

Figure 8:
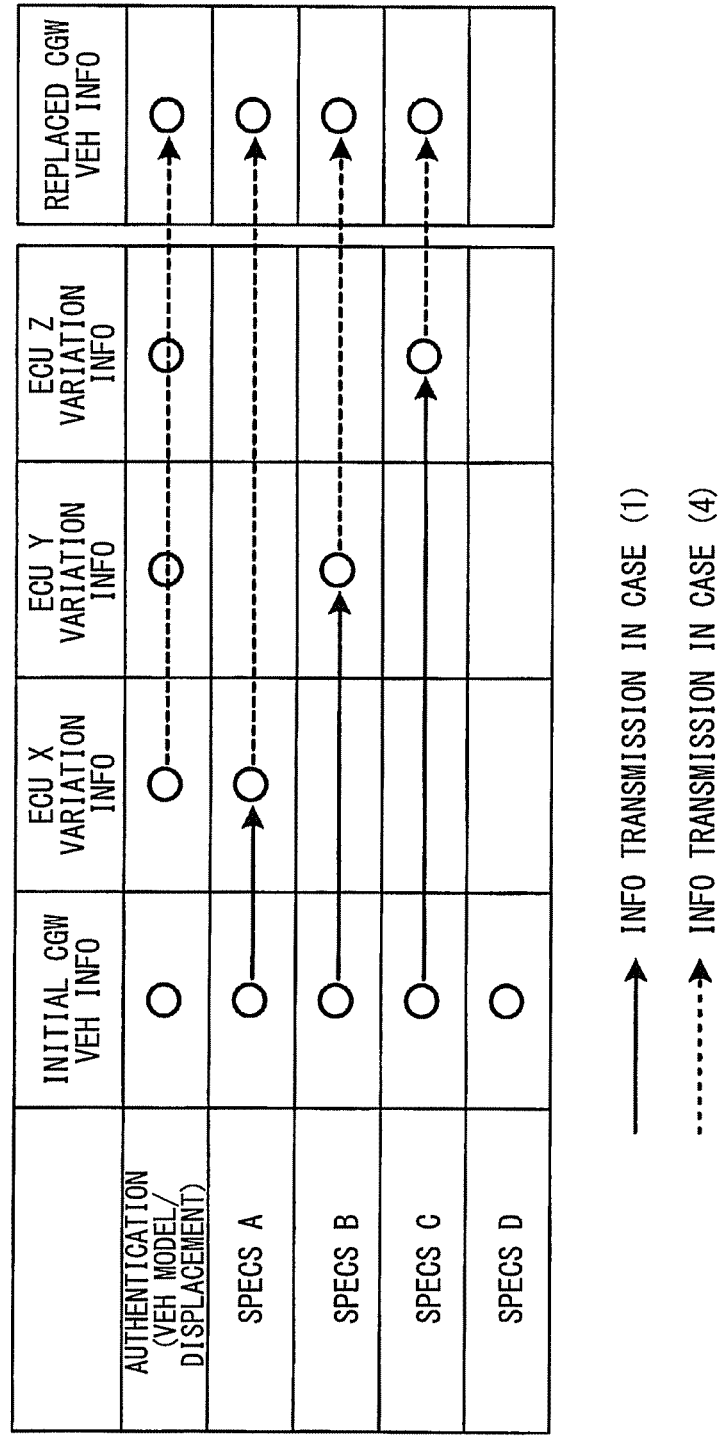
FIG. 8 is a schematic diagram illustrating vehicle information to be reproduced when the central gateway is replaced.

Subsequently, by executing the process as described in the case (1), the subsidiary information memory 332 of the CGW 3 stores the information. Incidentally, the variation information stored in each of the ECUs is only a part of the vehicle information, but as shown in FIG. 8, each of the ECUs (a ECU X, a ECU Y, a ECU Z) stores required information. Thus, the vehicle information which needs to be backed up is at least duplicated by merging the information without omission.

(Advantages)

As described above, in the vehicle communication system 1 according to the present disclosure, the characteristic information and the variation information, required in each of the device control ECUs 4, are stored in each of the device control ECUs 4 itself, and furthermore stored (i.e., backed up) in the CGW 3.

In a case where the device control ECU 4 is substituted for the replacement part, the vehicle information that is backed up in the CGW 3 is provided to the replaced ECU (corresponding to the replacement part) and the vehicle information is stored in the replaced ECU as the variation information.

According to such the vehicle communication system 1, when the device control ECU 4 is replaced, it is unnecessary to store the variation information (corresponding to the vehicle information) from the external portion into the device control ECU 4 again. It is possible to reduce a labor hour. Furthermore, it is unnecessary to store the vehicle information into the replacement part of the device control ECU 4 in advance, and to reduce a management cost of the replacement part.

In addition, in the vehicle communication system 1, in a case where the single ECU 4a is substituted for the replacement part or only the electronic controller 41 of the integrated ECU 4b is substituted for the replacement part, the vehicle information and the subsidiary information, backed up in the CGW 3, is provided to the replacement part (corresponding to the single ECU 4a/ the partially replaced ECU). The provided vehicle information and the subsidiary information are stored in the replacement part as the variation information and the characteristic information.

According to such the vehicle communication system 1, in a case where the single ECU 4a is replaced or only the electronic controller 41 of the integrated ECU 4b is replaced, it is unnecessary to store the characteristic information or the variation information (corresponding to the vehicle information) from the external portion again. It is possible to reduce a labor hour required for replacement. In addition, similar to a replacement part of the integrated ECU 4b, it is possible to reduce a management cost of the single ECU 4a and the replacement part of the electronic controller 41.

In the vehicle communication system 1, the variation information is separately stored in each of the device control ECUs 4. In a case where the CGW 3 is replaced, the variation information is provided to the CGW 3. The provided variation information are merged into a restored information (corresponding to the vehicle information), and then the restored information is stored into the CGW 3 as the vehicle information.

Therefore, according to the vehicle communication system 1, in a case where the CGW 3 is replaced, it is unnecessary to store the vehicle information from the eternal portion again. It is possible to reduce a labor hour required for the replacement.

(Another Embodiment)

Although the embodiment according to the present disclosure is described above, the present disclosure is not limited to the above embodiment. It is possible to be executed in various forms.

For example, in the above described embodiment, the CGW 3 is used as an electronic control apparatus for information memory. A dedicated ECU may be provided separately or an arbitrary ECU may execute a function corresponding to the communication process portion 32 of the CGW 3.

In the above described embodiment, it is explained that only the electronic controller 41 is replaceable in the integrated ECU 4b. It may be impossible to replace only the electronic controller 41. In this case, since the integrated ECU 4b always stores the characteristic information even when it is the replacement part, the process at step S390, step S410 to step S430 in FIG. 4 become unnecessary.

In the above embodiment, the electronic controller 41 of the device control ECU 4 stores the characteristic information memory 421 and the variation information memory 422. However, the electronic controller 41 may store either one of the characteristic information memory 421 and the variation information memory 422, and may store only the one of the information with the CGW 3.

In the above embodiment, the vehicle information is stored into the vehicle information memory 331 of the CGW 3 at the vehicle factory. The device control ECU 4 obtains the vehicle information (or a part of the vehicle information) from the CGW 3 and stores the vehicle information (or a part of the vehicle information) into the variation information memory 422 as the variation information. However, conversely, the variation information may be stored into the variation information memory 422 of the device control ECU 4 at the vehicle factory. The CGW 3 may store information, which is produced by merging variation information from each device control ECU 4, into the vehicle information memory 331 as the vehicle information.

The vehicle communication system according to the present disclosure includes at least one vehicle apparatus. The vehicle apparatus has an electronic controller to execute a process, by which a device to drive a predetermined object or a device portion configured from a device to obtain information about a predetermined object is controlled.

A vehicle communication system according to the present disclosure includes a device control apparatus mounted on a vehicle and has an electronic controller executing an device control process for controlling an external device or a device portion, and an information memory apparatus mounted on the vehicle. Incidentally, the device control apparatus includes a variation information memory for storing variation information necessary for identifying a variation of the predetermined object so that a process execution portion switches and executes a content in the device control process according to the variation information stored in the variation information memory. In addition, the information memory apparatus includes a vehicle information memory for storing the vehicle information. The vehicle information relates to a specification of the vehicle, on which the vehicle communication system is mounted. The variation information memory corresponds to a variation information memory method.

A vehicle information obtaining portion in the device control apparatus obtains vehicle information from the information memory apparatus at a predetermined timing, retrieves the variation information from the vehicle information and controls the variation information memory to store the variation information. In this case, a vehicle information providing portion in the information memory apparatus transmits the vehicle information stored in the vehicle information memory to the device control apparatus when the at least one device control apparatus requires the vehicle information. Incidentally, the predetermined timing denotes every predetermined period, a time when an apparatus is started up (i.e., power supply is started) or a predetermined instruction is inputted from an external portion, for example. The vehicle information obtaining portion corresponds to a vehicle information obtaining method. The vehicle information providing portion corresponds to a vehicle information providing method. The vehicle information memory corresponds to a vehicle information memory method.

In the vehicle communication system according to the present disclosure, the vehicle information is stored in the vehicle information memory of the information memory apparatus. The vehicle information is transmitted to the device control apparatus and stored as the variation information into the variation information memory of the device control apparatus when the vehicle information obtaining portion executes.

Thus, the variation information necessary for each device control apparatus is stored into each device control apparatus itself and furthermore backed up into the information memory apparatus. In a case where the device control apparatus is substituted for the replacement part, the vehicle information obtaining portion executes so that the vehicle information, stored in the information memory apparatus, is transmitted to the replacement part to be stored as the variation information.

Therefore, according to the vehicle communication system in the present disclosure, it is possible to reduce a labor hour required for replacement of the device control apparatus since it is unnecessary to store the vehicle information from the external portion again when the device control apparatus is replaced. In addition, it is possible to reduce a labor hour required for management of the replacement part since it is unnecessary that the replacement part of the device control apparatus stores the vehicle information in advance.

In the vehicle communication system according to the present disclosure, the electronic controller of the device control apparatus may include a characteristic information memory for storing characteristic information that represents a result of an actual measurement of a characteristic of the external device or the device portion. The process execution portion may switch and execute the content in the device control process according to the characteristic information and the variation information. The characteristic information memory corresponds to a characteristic information memory method.

Incidentally, the device control apparatus may be integrated with the device portion. The electronic controller of the integrated device control apparatus may be replaceable. An integrated apparatus corresponds to the device control apparatus which is configured to be integrated with the device portion. The single apparatus corresponds to the device control apparatus which is configured apart form the device portion.

The device control apparatus may be configured as described below in a case where the variation information memory is provided. Therefore, the electronic controller of the device control apparatus (I.e., the single apparatus and the integrated apparatus) includes a characteristic information providing portion for transmitting the characteristic information from the characteristic information memory to the information memory apparatus when the information memory apparatus requires the characteristic information and a subsidiary information obtaining portion for obtaining the characteristic information from the information memory apparatus and storing the characteristic information into the characteristic information memory in a case where the characteristic information is not stored in the characteristic information memory and when the information memory apparatus requires the characteristic information. The characteristic information providing portion corresponds to a characteristic information providing method. The subsidiary information obtaining portion corresponds to a subsidiary information obtaining method.

The information memory apparatus includes a subsidiary information memory for storing the characteristic information about all the device control apparatuses. The characteristic information obtaining portion obtains the characteristic information from the device control apparatus and stores the characteristic information into the subsidiary information memory at a predetermined timing. A subsidiary information providing portion transmits the characteristic information from the subsidiary information memory to the device control apparatus when the device control apparatus requires the characteristic information. The subsidiary information memory corresponds to a subsidiary information memory method. The subsidiary information providing portion corresponds to a subsidiary information providing method. The characteristic information obtaining portion corresponds to a characteristic information obtaining method.

According to the vehicle communication system in the present disclosure, the characteristic information stored in the electronic controller of the device control apparatus is backed up in the information memory apparatus by operation of the characteristic information obtaining portion.

In a case where the single apparatus is replaced or only the electronic controller of the integrated apparatus is replaced, the characteristic information is not stored in the electronic controller after replacement. By operation of the subsidiary information obtaining portion, the characteristic information, which is backed up in the information memory, is transmitted and stored into the electronic controller of the device control apparatus.

Thus, according to the vehicle communication system in the present disclosure, when the single apparatus is replaced or when only the electronic controller of the integrated apparatus is replaced, it is unnecessary to measure a characteristic of the device portion and to store a measurement result into the electronic controller, so that it is possible to reduce a labor hour required for a replacement.

Furthermore, the vehicle communication system in the present disclosure may have the following configuration. Thus, the electronic controller of the device control apparatus includes a variation information providing portion, which stores the variation information. The variation information providing portion transmits the variation information to the information memory apparatus according to a demand from the information memory apparatus. The variation information providing portion corresponds to a variation information providing method.

In addition, the information memory apparatus includes the variation information obtaining portion for demanding the variation information of all the device control apparatuses in a case where a predetermined initialization condition is satisfied, merging the variation information into the vehicle information, and storing the variation information into the vehicle information memory.

According to the vehicle communication system in the present disclosure, although information is not stored in the vehicle information memory or the subsidiary information memory just after replacement, the vehicle information is duplicated (or restored) from the variation information by operation of the variation information obtaining portion. The vehicle information is stored into the vehicle information memory. The characteristic information is stored into the subsidiary information memory by operation of the above described characteristic information obtaining portion. The vehicle information is separately stored in the device control apparatus. The variation information obtaining portion corresponds to a variation information obtaining method.

Therefore, according to the vehicle communication system in the present disclosure, it is unnecessary to store the vehicle information from the external portion again when the information memory apparatus is replaced and it is possible to reduce a labor hour required for replacement.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle communication system between a device control electric control unit (ECU) and an information memory apparatus comprising:
at least one device control ECU mounted on a vehicle and having an electronic controller executing a device control process for controlling a device portion, which drives a predetermined object or obtains information about the predetermined object; and
an information memory apparatus mounted on the vehicle and different from the at least one device control ECU, wherein:
the electronic controller includes:
a variation information memory storing variation information that identifies the predetermined object, which is driven or detected by the device portion;
a characteristic information memory storing characteristic information that represents a result of an actual measurement with respect to a characteristic of the device portion;
a process execution portion switching a content of the device control process to another content and executing the another content according to the variation information stored in the variation information memory and the characteristic information stored in the characteristic information memory;
a vehicle information obtaining portion obtaining vehicle information from the information memory apparatus at a predetermined timing, extracting the variation information from the vehicle information, and controlling the variation information memory to store the variation information, wherein the vehicle information corresponds to a result of merging the variation information of each of the at least one device control ECU and represents a specification of the vehicle;
a characteristic information providing portion transmitting the characteristic information from the characteristic information memory to the information memory apparatus when the information memory apparatus requires the characteristic information; and
a subsidiary information obtaining portion obtaining the characteristic information from the information memory apparatus and storing the characteristic information to the characteristic information memory when the information memory apparatus requires the characteristic information in a state where the characteristic information memory does not store the characteristic information; and
the information memory apparatus includes:
a vehicle information memory storing the vehicle information;
a vehicle information providing portion transmitting the vehicle information stored in the vehicle information memory to the at least one device control ECU when the at least one device control ECU requires the vehicle information;
a subsidiary information memory storing the characteristic information associated with each of the at least one device control ECU;
a characteristic information obtaining portion obtaining the characteristic information from the at least one device control ECU and storing the characteristic information to the subsidiary information memory at another predetermined timing; and
a subsidiary information providing portion transmitting the characteristic information from the subsidiary information memory to the at least one device control ECU when the at least one device control ECU requires the characteristic information, wherein
the characteristic information is transmitted from the at least one device control ECU to the subsidiary information memory and stored in the subsidiary information memory at the another predetermined timing; and
the characteristic information is transmitted from the information memory apparatus to the characteristic information memory and stored in the characteristic information memory when the information memory apparatus requires the characteristic information of the characteristic information memory in a state where the characteristic information memory does not store the characteristic information.

2. The vehicle communication system according to claim 1, wherein
the at least one device control apparatus is integrated with the device portion.

3. The vehicle communication system according to claim 2, wherein
the electronic controller is replaceable.

4. The vehicle communication system according to claim 1, wherein
the characteristic information is stored into the characteristic information memory before the at least one device control apparatus is shipped, and
the vehicle information is stored into the vehicle information memory after the information memory apparatus is assembled into the vehicle.

5. The vehicle communication system according to claim 1, wherein:
the vehicle information obtaining portion stores authentication information in order to determine whether the vehicle is compatible with the at least one device control apparatus;
the vehicle information obtaining portion provides the authentication information to the information memory apparatus when the vehicle information obtaining portion requires the vehicle information; requires the vehicle information;
the vehicle information providing portion checks the authentication information with the vehicle information; and
the vehicle information providing portion transmits the vehicle information when it is determined that the vehicle is compatible with the at least one device control apparatus.

6. The vehicle communication system according to claim 1, wherein,
the electronic controller further includes a variation information providing portion providing the variation information to the information memory apparatus when the information memory apparatus requires the variation information, and
the information memory apparatus further includes the variation information obtaining portion requiring the variation information of the at least one device control apparatus when a predetermined initialization condition is satisfied, merging the variation information into the vehicle information, and storing the variation information into the vehicle information memory.

7. The vehicle communication system according to claim 1, further comprising:
a plurality of subnetworks, wherein
the information memory apparatus is a gateway apparatus for connecting the plurality of subnetworks.

8. The vehicle communication system according to claim 7, wherein
the at least one device control apparatus is a plurality of device control apparatuses,
the plurality of subnetworks connect to the plurality of device control apparatuses, respectively, and
the information memory apparatus connects the plurality of device control apparatuses through the plurality of subnetworks.

9. A vehicle communication system between a device control electric control unit (ECU) and an information memory apparatus comprising:
at least one device control ECU mounted on a vehicle and having an electronic controller executing a device control process for controlling an object device wherein the object device is separated from the electronic controller and drives a predetermined object or obtains information about the predetermined object; and
an information memory apparatus mounted on the vehicle and different from the at least one device control ECU, wherein:
the electronic controller includes:
a variation information memory storing variation information that identifies the predetermined object, which is driven or detected by the device portion;
a characteristic information memory storing characteristic information that represents a result of an actual measurement with respect to a characteristic of the object device;
a process execution portion switching a content of the device control process to another content and executing the another content according to the variation information stored in the variation information memory and the characteristic information stored in the characteristic information memory;
a vehicle information obtaining portion obtaining vehicle information from the information memory apparatus at a predetermined timing, extracting the variation information from the vehicle information, and controlling the variation information memory to store the variation information, wherein the vehicle information corresponds to a result of merging the variation information of each of the at least one device control ECU and represents a specification of the vehicle;
a characteristic information providing portion transmitting the characteristic information from the characteristic information memory to the information memory apparatus when the information memory apparatus requires the characteristic information; and
a subsidiary information obtaining portion obtaining the characteristic information from the information memory apparatus and storing the characteristic information to the characteristic information memory when the information memory apparatus requires the characteristic information in a state where the characteristic information memory does not store the characteristic information; and
the information memory apparatus includes:
a vehicle information memory storing the vehicle information;
a vehicle information providing portion transmitting the vehicle information stored in the vehicle information memory to the at least one device control ECU when the at least one device control ECU requires the vehicle information,
a subsidiary information memory storing the characteristic information associated with each of the at least one device control ECU;
a characteristic information obtaining portion obtaining the characteristic information from the at least one device control ECU and storing the characteristic information to the subsidiary information memory at another predetermined timing; and
a subsidiary information providing portion transmitting the characteristic information from the subsidiary information memory to the at least one device control ECU when the at least one device control ECU requires the characteristic information, wherein
the characteristic information is transmitted from the at least one device control ECU to the subsidiary information memory and stored to the subsidiary information memory at the another predetermined timing, and
the characteristic information is transmitted from the information memory apparatus to the characteristic information memory and stored to the characteristic information memory when the information memory apparatus requires the characteristic information of the characteristic information memory in a state where the characteristic information memory does not store the characteristic information.

10. A vehicle communication system between a device control electric control unit (ECU) and an information memory apparatus comprising:
at least one device control ECU mounted on a vehicle and having an electronic controller executing a device control process for controlling a device portion, which drives a predetermined object or obtains information about the predetermined object; and
an information memory apparatus mounted on the vehicle and different from the at least one device control ECU, wherein:
the electronic controller includes:
a variation information memory storing variation information that identifies the predetermined object, which is driven or detected by the device portion,
a characteristic information memory storing characteristic information that represents a result of an actual measurement with respect to a characteristic of the device portion;
a process execution portion switching a content of the device control process to another content and executing the another content according to the variation information stored in the variation information memory and the characteristic information stored in the characteristic information memory;
a vehicle information obtaining portion obtaining vehicle information from the information memory apparatus, extracting the variation information from the vehicle information, and controlling the variation information memory to store the variation information, wherein the vehicle information corresponds to a result of merging the variation information of each of the at least one device control ECU and represents a specification of the vehicle;
a characteristic information providing portion transmitting the characteristic information from the characteristic information memory to the information memory apparatus; and a subsidiary information obtaining portion obtaining the characteristic information from the information memory apparatus and storing the characteristic information to the characteristic information memory in a state where the characteristic information memory does not store the characteristic information; and the information memory apparatus includes:
   a vehicle information memory storing the vehicle information;
   a vehicle information providing portion transmitting the vehicle information stored in the vehicle information memory to the at least one device control ECU;
   a subsidiary information memory storing the characteristic information associated with each of the at least one device control ECU;
   a characteristic information obtaining portion obtaining the characteristic information from the at least one device control ECU and storing the characteristic information to the subsidiary information memory; and
   a subsidiary information providing portion transmitting the characteristic information from the subsidiary information memory to the at least one device control ECU, wherein the characteristic information is transmitted from the at least one device control ECU to the subsidiary information memory and stored to the subsidiary information memory in the information memory apparatus, and the characteristic information is transmitted from the information memory apparatus to the characteristic information memory and stored to the characteristic information memory in a state where the characteristic information memory does not store the characteristic information.

\* \* \* \* \*